(12) United States Patent
Nakamura

(10) Patent No.: US 7,679,840 B2
(45) Date of Patent: Mar. 16, 2010

(54) OPTICAL APPARATUS

(75) Inventor: Hidekazu Nakamura, Tochigi (JP)

(73) Assignee: Canon Kabushiki Kaisha (JP)

( * ) Notice: Subject to any disclaimer, the term of this patent is extended or adjusted under 35 U.S.C. 154(b) by 568 days.

(21) Appl. No.: 11/332,789

(22) Filed: Jan. 12, 2006

(65) Prior Publication Data
US 2006/0158745 A1 Jul. 20, 2006

Related U.S. Application Data

(63) Continuation of application No. 10/964,531, filed on Oct. 13, 2004, now Pat. No. 7,046,457.

(30) Foreign Application Priority Data
Oct. 14, 2003 (JP) ............................. 2003-354153

(51) Int. Cl.
G02B 15/14 (2006.01)
(52) U.S. Cl. .................. 359/705; 359/695; 359/699
(58) Field of Classification Search ................ 359/704, 359/694–696
See application file for complete search history.

(56) References Cited

U.S. PATENT DOCUMENTS 5,815,325 A * 9/1998 Johnson ..................... 359/696
6,453,123 B1 * 9/2002 Oshima ...................... 396/79

FOREIGN PATENT DOCUMENTS

JP 63083711 A * 4/1988

* cited by examiner

Primary Examiner—Ricky L Mack
Assistant Examiner—Brandi N Thomas
(74) Attorney, Agent, or Firm—Rossi, Kimms & McDowell LLP

(57) ABSTRACT

An optical apparatus includes an image taking optical system that includes a first lens unit arranged on a most object side and a second lens unit movable in an optical axis direction further on an image surface side than the first lens unit, a first lens barrel that holds the first lens unit, a second lens barrel that is combined with the first lens barrel and houses the second lens unit so that the unit is movable, and a control unit that is arranged around an outer periphery of the second lens barrel and includes an operation member, which is operated in order to instruct driving of the second lens unit, and an electric component for controlling the driving of the second lens unit according to the operation of the operation member, in which a maximum outer diameter of the first lens unit is larger than a minimum inner diameter of the control unit.

2 Claims, 7 Drawing Sheets

OPTICAL APPARATUS

CROSS-REFERENCE TO RELATED APPLICATIONS

This application is a continuation of U.S. patent application Ser. No. 10/964,531 filed on Oct. 13, 2004 now U.S. Pat. No. 7,046,457.

BACKGROUND OF THE INVENTION

1. Field of the Invention

The present invention relates to an optical apparatus such as a lens apparatus, a digital camera, or a video camera.

2. Related Background Art

In many of the optical apparatuses such as those described above, a so-called rear focus (inner focus) zoom lens is used. This rear focus zoom lens includes: a front lens that is arranged on a most object side, a zoom lens that moves in an optical axis direction on an image surface side than the front lens and performs zooming operation; and a focus lens that moves in the optical axis direction and performs correction (compensator function) for image surface fluctuation due to the zooming operation and focusing.

In the rear focus zoom lens described above, the focus lens is driven by a focus drive signal from a camera controller, whereby focus adjustment is performed. In addition, the zoom lens is driven by a zoom drive signal, which is generated by an operation of a zoom switch by a user, and the focus lens is also driven by the zoom drive signal to correct image surface fluctuation due to zooming operation, whereby zooming is performed.

An optical apparatus has been proposed which makes it possible to perform focus adjustment and a zoom operation manually using a focus operation ring and a zoom operation ring as well in order to improve operability (e.g., paragraphs 0022 to 0028, FIG. 1, etc. of Japanese Patent Application Laid-Open No. H09-304679).

FIG. 7 shows a structure of a lens apparatus mounted with a conventional rear focus zoom lens. In FIG. 7, a manual focus ring 101a and a manual zoom ring 101b, which perform a focus operation and a zoom operation manually, are elements constituting an exterior of the lens apparatus. The manual focus ring 101a and the manual zoom ring 101b are held by an external unit 101 so as to be rotatable. Note that, the external unit 101 also includes electric components such as sensors for detecting rotation of the manual focus ring 101a and the manual zoom ring 101b and an actuator for driving a focus lens and a zoom lens, which are not shown in the figure, on the basis of outputs from the sensors as well as the manual focus ring 101a and the manual zoom ring 101b.

As described above, the components of the external unit are constituted as a unit and then attached to a lens barrel unit to be described later, whereby the lens apparatus can be assembled easily compared with the case where respective components are attached individually.

Reference numeral 102 denotes a lens barrel unit in which optical elements such as a front lens, a zoom lens, and a focus lens are held or housed so as to be movable in an optical axis direction.

A tubular section (hereinafter referred to as a front holding barrel) 103 on an object side (an inner side in the figure) of the lens barrel unit 102 is inserted into the inside of the external unit 101 from an image surface side (a rear side in the figure). Then, the external unit is assembled around an outer periphery of the front holding barrel 103. Therefore, an inner diameter 101c of the external unit 101 is set larger than an outer diameter 103b of the front holding barrel 103. Note that the outer diameter 103b of the front holding barrel 103 is determined according to an outer diameter of the largest front lens among lenses.

Reference numerals 103a and 104a denote flange sections that are formed at an end on the image surface side of the front holding barrel 103 and at an end on the object side in an image pickup element holding barrel 104 constituting a part on the image surface side of the lens barrel unit 102, respectively. The front holding barrel 103 and the image pickup element holding barrel 104 are combined in those flange sections 103a and 104a. Note that an image pickup element, which photo-electrically converts an object image focused by the rear focus zoom lens, a lens stop unit, and the like are held in the image pickup element holding barrel 104.

Here, both the flange sections 103a and 104a have to be formed such that a space for combining the flange sections 103a and 104a is secured while a space for arranging an actuator, which drives the lenses and the lens stop unit arranged in the image pickup element holding barrel 104, is secured. Consequently, each of the flange sections 103a and 104a has an extremely large outer diameter compared with the outer diameter 103b of the front holding barrel 103 and has the largest outer diameter in the lens barrel unit 102.

Therefore, when the external unit 101 is assembled to the lens barrel unit 102, it is necessary to insert the front holding barrel 103 of the lens barrel unit 102 into the inside of the external unit 101 from the image surface (image pickup element) side.

Incidentally, recently, more wider angle of a zoom lens has been desired in many cases, and a wide-angle zoom lens tends to have a larger diameter (outer diameter) of a front lens. Consequently, the outer diameter of the front holding barrel 103 in FIG. 7 also increases.

However, in the structure of the conventional lens apparatus described above, as the diameter of the front lens (i.e., the outer diameter of the front holding barrel 103) increases, it is necessary to increase the inner diameter of the external unit 101 to make it possible to insert the front holding barrel 103 into the inside of the external unit 101. On the other hand, since sizes of electric components to be arranged in the external unit 101 are fixed, it is difficult to reduce a difference of outer and inner diameters necessary for the external unit 101. This results in an increase in size of the outer diameter of the external unit.

SUMMARY OF THE INVENTION

It is an object of the present invention to provide an optical apparatus in which, even if a diameter of a front lens increases, an increase in size of an outer diameter of a control unit can be suppressed and the optical apparatus can be made compactly.

In order to achieve the above object, according to one aspect of the present invention, there is provided an optical apparatus, which includes:

an image taking optical system that includes a first lens unit arranged on a most object side and a second lens unit movable in an optical axis direction at an image surface side than the first lens unit;

a first lens barrel that holds the first lens unit;

a second lens barrel that is combined with the first lens barrel and houses the second lens unit so that the unit is movable; and a control unit that is arranged around an outer periphery of the second lens barrel and includes an operation element, which is operated in order to instruct driving of the second lens unit, and an electric component for controlling the driving of the second lens unit according to the operation of the operation element, in which a maximum outer diameter of the first lens unit is larger than a minimum inner diameter of the control unit.

DETAILED DESCRIPTION OF THE PREFERRED EMBODIMENTS

An embodiment of the present invention will be hereinafter explained with reference to the accompanying drawings.

Figure 1:
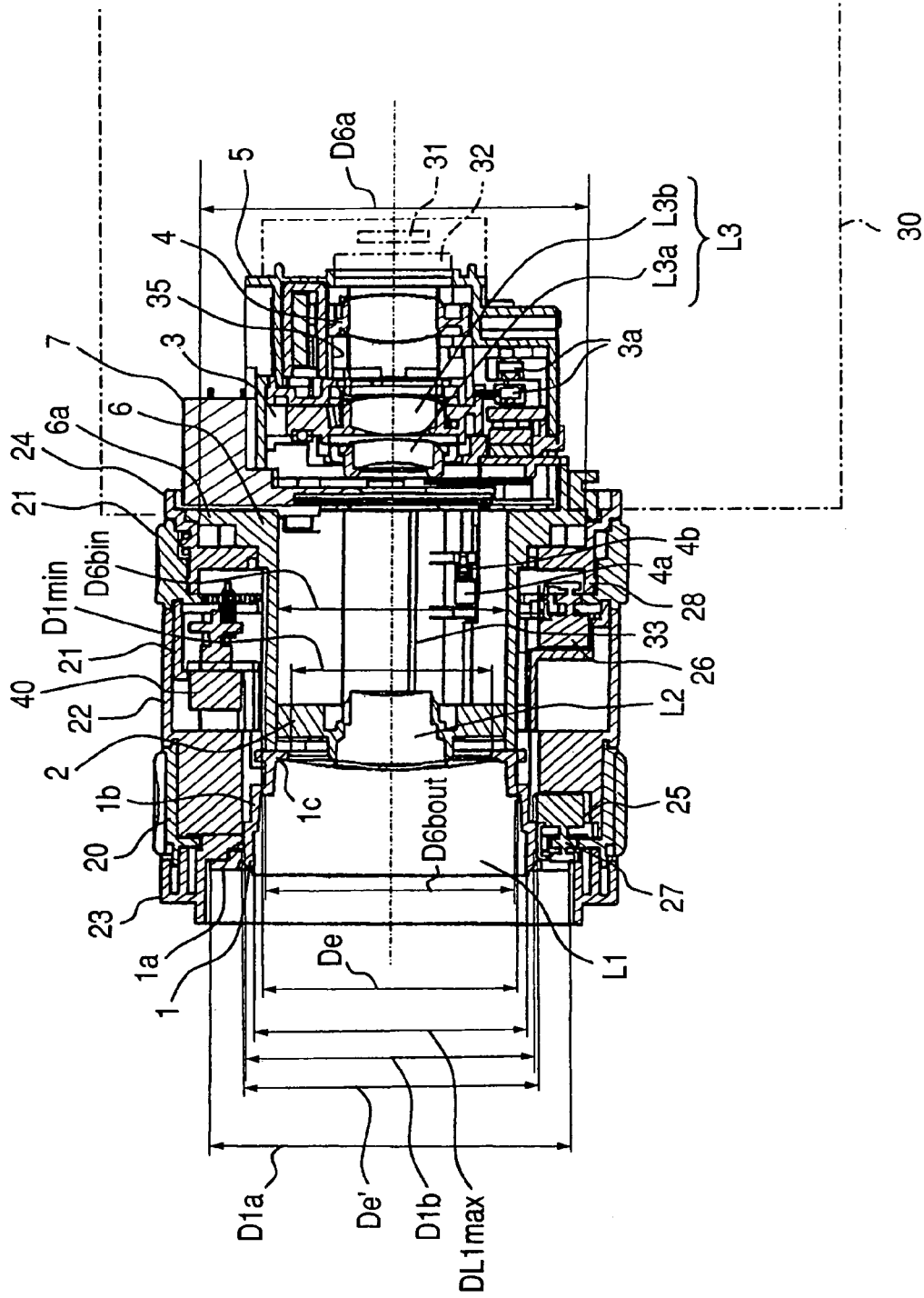
FIG. 1 is a sectional view showing a structure of an image taking optical unit of an image pickup apparatus that is an embodiment of the present invention.
Figure 2:
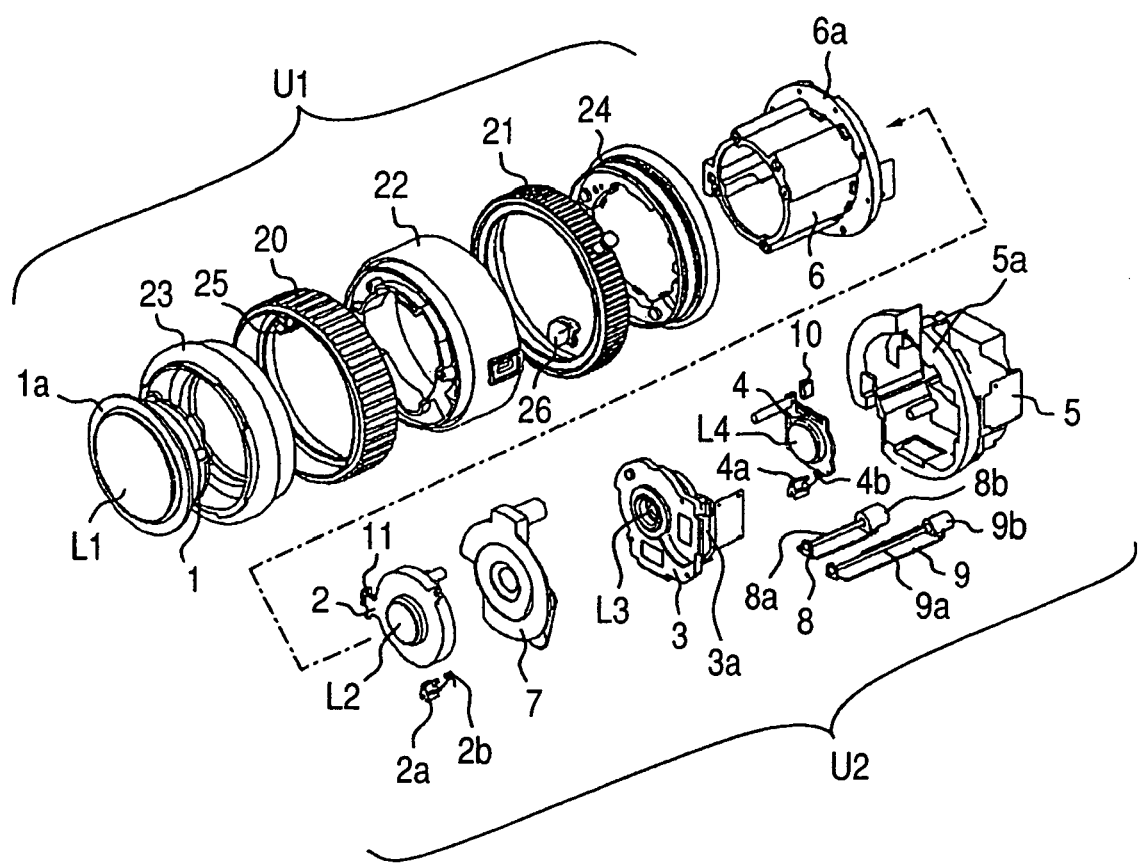
FIG. 2 is a disassembled perspective view of the image taking optical unit.

FIG. 1 is a sectional view showing a structure of an image taking optical unit (lens apparatus) of an image pickup apparatus (optical apparatus) such as a video camera or a digital still camera that is an embodiment of the present invention. FIG. 2 is a disassembled perspective view showing a structure of the image taking optical unit. The image taking optical unit of the embodiment has a rear focus zoom optical system, which includes four lens units, that is, convex (positive power), concave (negative power), convex (positive power), and convex (positive power) lenses in order from an object side (left side in the figure), as an image taking lens system.

First, a structure of a lens barrel unit denoted by U2 in FIG. 2 of the image taking optical unit will be explained with reference to FIGS. 1 and 2.

In the lens barrel unit U2, in order from the object side, reference sign L1 denotes a fixed front lens unit (first lens unit) and L2 denotes a zoom lens unit (second lens unit) that moves in an optical axis direction and performs zooming.

Reference sign L3 denotes a correction lens unit that includes a fixed lens element L3a and a shift lens element L3b that shifts in a direction perpendicular to an optical axis and optically corrects image blur due to hand shake or the like. In addition, reference sign L4 denotes a focus lens unit that moves in the optical axis direction and performs focus adjustment.

Note that each of those lens units may be constituted by one lens element or may be constituted by combining plural lens elements.

Reference numeral 1 denotes a front lens barrel (first lens barrel) that holds the front lens unit L1 and 2 denotes a zoom moving frame that holds the zoom lens unit. Reference numeral 3 denotes a correction lens holding frame that fixes and holds the fixed lens element L3a of the correction lens unit L3, holds the shift lens unit L3b so that the unit is movable in the direction perpendicular to the optical axis, and further holds an actuator 3a that drives the shift lens unit L3b. Reference numeral 4 denotes a focus moving frame that holds the focus lens unit L4.

Reference numeral 5 denotes a rear lens barrel (third lens barrel) that holds an image pickup element 31 (indicated by an alternate long and short dash line in FIG. 1), which photoelectrically converts a subject image formed by an image taking optical system, such as a CCD or a CMOS sensor. An optical filter 32 (indicated by an alternate long and short dash line in FIG. 1) such as an infrared ray cut filter or a low pass filter is also held by the rear lens barrel 5. Moreover, the rear lens barrel 5 also fixes and holds the correction lens holding frame 3.

Reference numeral 6 denotes an intermediate lens barrel (second lens barrel). The front lens barrel 1 and the rear lens barrel 5 are combined with an end on an object side (front side) of the intermediate lens barrel 6 and an image surface side (rear side) thereof, respectively. The rear lens barrel 5 and the intermediate lens barrel 6 position and hold not-shown two guide bars 33 (although only one of the guide bars 33 is shown in FIG. 1). The zoom moving frame 2 is supported by those guide bars 33 so as to be movable in the optical axis direction. In addition, the correction lens holding frame 3 and the rear lens barrel 5 position and fix two guide bars 35 (although only one of the guide bars 35 is shown in FIG. 1). The focus moving frame 4 is supported by those guide bars so as to be movable in the optical axis direction.

Reference numeral 7 denotes a lens stop unit, which changes an aperture diameter of an image taking optical system to adjust an amount of light to be made incident in the image pickup element 31. The lens stop unit 7 is a so-called iris stop that moves to open and close six lens stop blades to change an aperture diameter thereof. The lens stop unit 7 is fixed to the rear lens barrel 5 by means of not-shown one screw.

The intermediate lens barrel 6 is fixed to the rear lens barrel 5 after being positioned with respect to the rear lens barrel 5. More specifically, a flange section 6a is formed on an outer periphery at a rear end of a cylindrical section 6b, which is a section where the zoom lens unit L2 is housed so as to be movable, in the intermediate lens barrel 6. The flange section 6a and a flange section 5a (see FIG. 2) formed at a front end of the rear lens barrel 5 are fixed by means of not-shown five screws.

In addition, the front lens barrel 1 is fixed to the intermediate lens barrel 6 by means of not-shown four screws after being positioned with respect to the intermediate lens barrel 6.

In FIG. 2, reference numeral 8 denotes a focus motor unit serving as an actuator that drives the focus lens unit L4 in the optical axis direction. A lead screw 8a is integrally formed in a rotor that is driven by a stepping motor 8b of the focus motor unit 8. A rack 4a attached to the focus moving frame 4 engages with the lead screw 8a. Consequently, when the lead screw 8a rotates together with the rotor, the focus lens unit L4 is driven in the optical axis direction together with the focus moving frame 4 by an engaging action of the lead screw 8a and the rack 4a.

In addition, the focus moving frame 4, the rack 4a, the lead screw 8a, and the guide bars are biased and urged by a torsion coil spring 4b, whereby loose fitting among the focus moving frame 4, the rack 4a, the lead screw 8a, and the guide bars is eliminated.

Reference numeral 9 denotes a zoom motor unit serving as an actuator that drives the zoom lens unit L2 in the optical axis direction. A lead screw 9a is integrally formed in a rotor that is driven by a stepping motor 9b of the zoom motor unit 9b. A rack 2a attached to the zoom moving frame 2 engages with the lead screw 9a. Consequently, when the lead screw 9a rotates together with the rotor, the zoom lens unit L2 is driven in the optical axis direction together with the zoom moving frame 2 by an engaging action of the lead screw 9a and the rack 2a.

In addition, the zoom moving frame 2, the rack 2a, the lead screw 9a, and the guide bars 33 are biased and urged by a torsion coil spring 2b, whereby loose fitting among the zoom moving frame 2, the rack 2a, the lead screw 9a, and the guide bars 33 is eliminated.

Both the motor units 8 and 9 are fixed to the rear lens barrel 5 by means of not-shown two screws, respectively.

Reference numeral 10 denotes a focus reset switch for detecting a reference position of the focus lens unit L4. The focus reset switch 10 is constituted by a photo-interrupter fixed to the rear lens barrel 5 by means of one screw via a not-shown substrate. The focus reset switch 10 optically detects switching of shielded and transmitted states of detection light due to the movement in the optical axis direction of a light-Shielding section (not shown) formed in the focus moving frame 4, and outputs an electric signal.

Reference numeral 11 denotes a zoom reset switch for detecting a reference position of the zoom lens unit L2. The zoom reset switch 11 is constituted by a photo-interrupter fixed to the rear lens barrel 5 by means of one screw via a not-shown holding member. The zoom reset switch 11 optically detects switching of shielded and transmitted states of detection light due to the movement in the optical axis direction of a light-shielding section 2c formed in the zoom moving frame 2, and outputs an electric signal.

Next, a structure of an external unit serving as a control unit, which is denoted by reference numeral U1 in FIG. 2, of the image taking optical unit will be explained. Reference numerals 20 and 21 denote a manual focus ring and a manual zoom ring serving as operation members, respectively. The manual focus ring 20 is attached to an outer periphery in a front of an intermediate ring 22 serving as a base member for an external unit U2 so as to be rotatable. The manual focus ring 20 is sandwiched by a front side stepped section of the intermediate ring 22 and a front side pressing ring 23 to be prevented from moving lengthwise with a clearance necessary for rotation left. The manual zoom ring 21 is attached to an outer periphery in a rear of the intermediate ring 22 so as to be rotatable. The manual zoom ring 21 is sandwich by a rear side stepped section of the intermediate ring 22 and a rear side pressing ring 24 to be prevented from moving lengthwise with a clearance necessary for rotation left.

Note that a flange section 1a is formed on an outer periphery at a front end of a cylindrical section (since the outer diameter of the front lens unit L1 decreases stepwise from the front side, inner and outer diameters of this cylindrical section also decrease stepwise from the front side) 1b that is a section for holding the front lens unit L1 in the front lens barrel 1. The flange section 1a sandwiches and holds the front side pressing ring 23 with a front end surface of the external unit U1.

Reference numeral 25 denotes an MR encoder for detecting a rotational position of the manual focus ring 20, and 26 denotes an MR encoder for detecting a rotational position of the manual zoom ring 21. Although not denoted by reference numerals in FIG. 1, those MR encoders 25 and 26 include magnetic scales, which have different magnetic poles alternately formed in a peripheral direction and are supported by the intermediate ring 22 so as to be rotatable, and MR sensors, which are arranged in parts of outer peripheries of the magnetic scales so as to be opposed to the magnetic scales at a predetermined interval and are supported by the intermediate ring 22.

Internal gear sections are formed on inner peripheries of the manual focus ring 20 and the manual zoom ring 21. Rotation of the manual focus ring 20 and the manual zoom ring 21 is transmitted to the magnetic scales via idler gears 27 and 28 that engage with the internal gear sections. In this way, when the magnetic scales rotate with respect to the MR sensors, electric signals, which change according to change of the magnetic poles opposed to the MR sensors of the magnetic scales, are outputted from the MR sensors.

Reference numeral 40 denotes a potentiometer, which performs detection for a rotational absolute position of the manual zoom ring 21.

In this way, as shown in FIG. 1, the manual zoom ring 21 and the manual focus ring 20, which are operated in order to instruct driving of the zoom lens unit L2 and the focus lens unit L4, and the external unit U1, which is constituted to hold the electric components (the MR encoders 25 and 26 and the potentiometer) for controlling the driving of both the lens units L2 and L4 according to the operation, are assembled around an outer periphery of the cylindrical section 6b of the intermediate lens barrel 6 and around an outer periphery of the cylindrical section 1b of the front lens barrel 1 (an assembling method will be described later). The manual zoom ring 21 and the manual focus ring 20, and the external unit U1 are arranged so as to be sandwiched in the optical axis direction between the flange section 1a having the maximum outer diameter in the front lens barrel 1 and the flange section 6a having the maximum outer diameter in the intermediate lens barrel 6.

The image taking optical unit constituted as described above is fixed to a camera body 30, which is indicated by an alternate long and short dash line in FIG. 1, via the rear lens barrel 5 and constitutes an image pickup apparatus of a lens integrated type.

Figure 3:
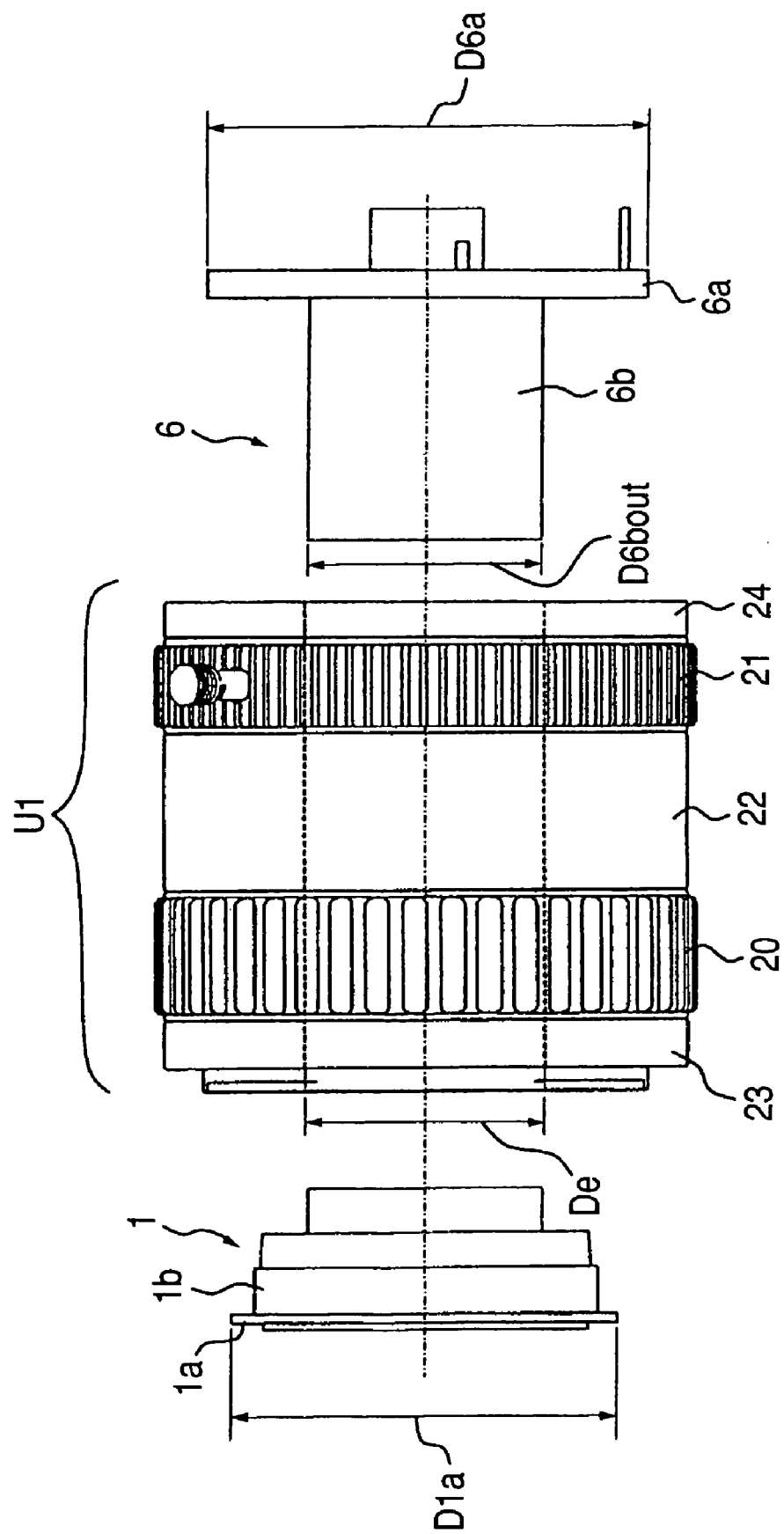
FIG. 3 is a side view showing a relation among inner and outer diameters of an external unit, a front lens barrel, and an intermediate lens barrel that constitute the image taking optical unit.

Next, a relation among diameter dimensions of the respective members and the external unit in this embodiment will be explained with reference to FIGS. 1 and 3.

As described above, the external unit U1 is arranged so as to be sandwiched between the flange section 1a of the front lens barrel 1 and the flange section 6a of the intermediate lens barrel 6, and is fixed to the flange section 6a by means of the not-shown three screws after being positioned with respect to the intermediate lens barrel 6.

In this case, when it is assumed that the maximum outer diameter of the front lens unit L1 is $DL1max$, an outer diameter of the cylindrical section 1b of the front lens barrel 1 (here, the maximum outer diameter of the cylindrical section 1b of the front lens barrel 1, in other words, a maximum diameter of a portion of the front lens barrel 1 excluding the flange section 1a and is referred to as a small diameter section of the front lens barrel 1) other words, a maximum diameter of a portion of the front lens barrel 1 excluding the flange section 1a and referred to as a small diameter section of the front lens barrel 1) is $D1b$, an outer diameter of the flange section 1a of the front lens barrel 1 (a large diameter section of the front lens barrel 1) is $D1a$, an inner diameter (here, the minimum inner diameter) of the external unit U1 is $De$, an outer diameter of the cylindrical section 6b of the intermediate lens barrel 6 (a small diameter section of the intermediate lens barrel 6) is $D6bout$, and an outer diameter of the flange section 6a of the intermediate lens barrel 6 (a large diameter section of the intermediate lens barrel 6) is D6*a*, a relation among the diameters is as follows.

D6bout<De<DL1max<D1b<D1a≦D6a

In addition, when it is assumed that an inner diameter of a section arranged around the outer periphery of the cylindrical section 1*b* of the front lens barrel 1 of the external unit U1 is De', the following relation is also established.

D1b<De'<D1a

Moreover, a section 1*c*, which has an inner diameter D1*min* smaller than the minimum inner diameter D6*bin* of the cylindrical section 6*b* of the intermediate lens barrel 6 (that is, projects further to an inner side than the inner periphery of the cylindrical section 6*b* of the intermediate lens barrel 6), is integrally formed at the rear end in the front lens barrel.

The section has a role of a flare cut stop for cutting unnecessary rays, which cause flare, ghost, and the like, of light made incident through the front lens unit L1 to prevent the rays from being made incident in the optical system including the zoom lens unit L2 and the lens units following the zoom lens unit L2.

Figure 6:
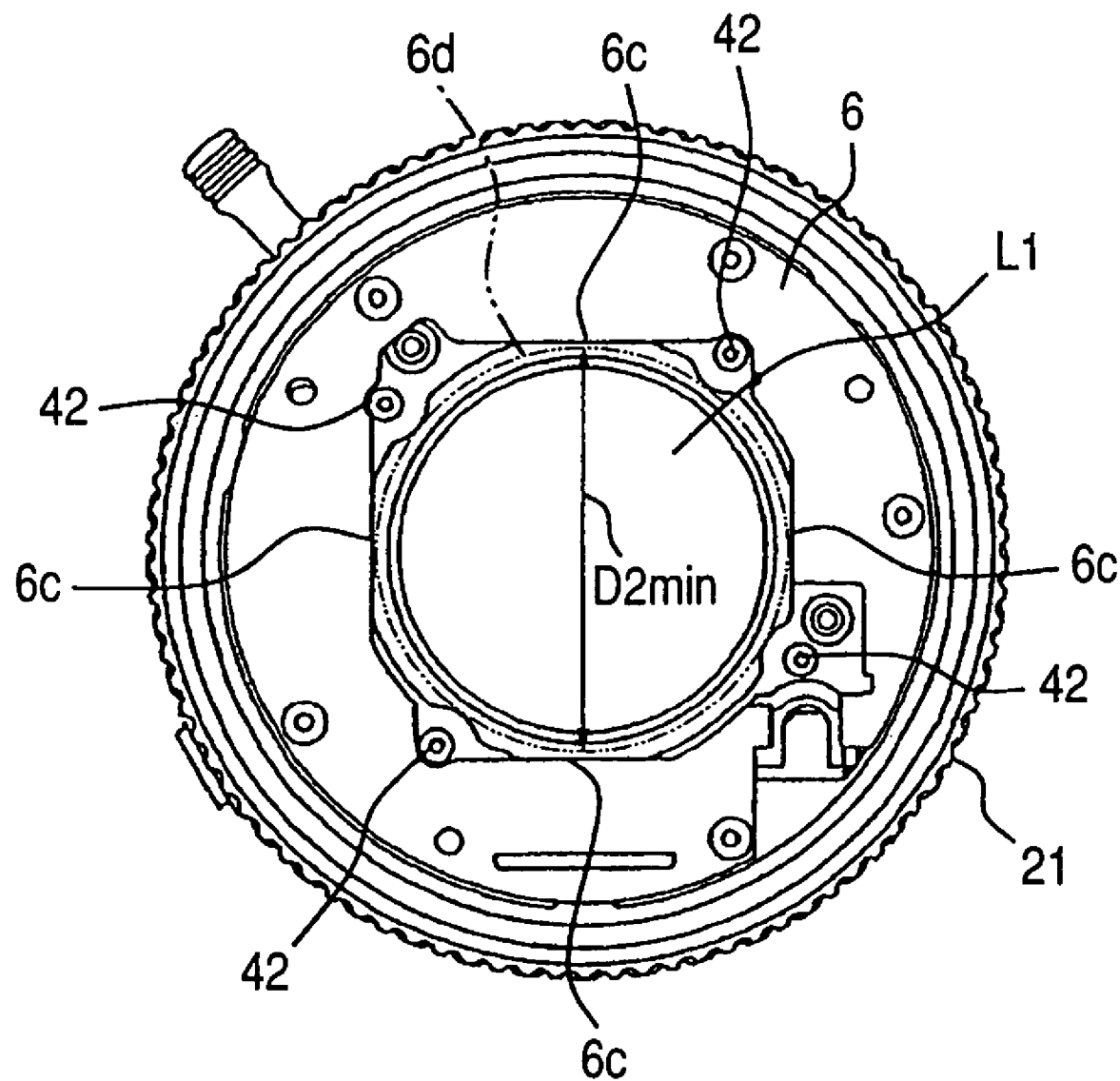
FIG. 6 is a rear view showing a machine screw structure of the front lens barrel and the intermediate lens barrel of the embodiment.
Figure 7:
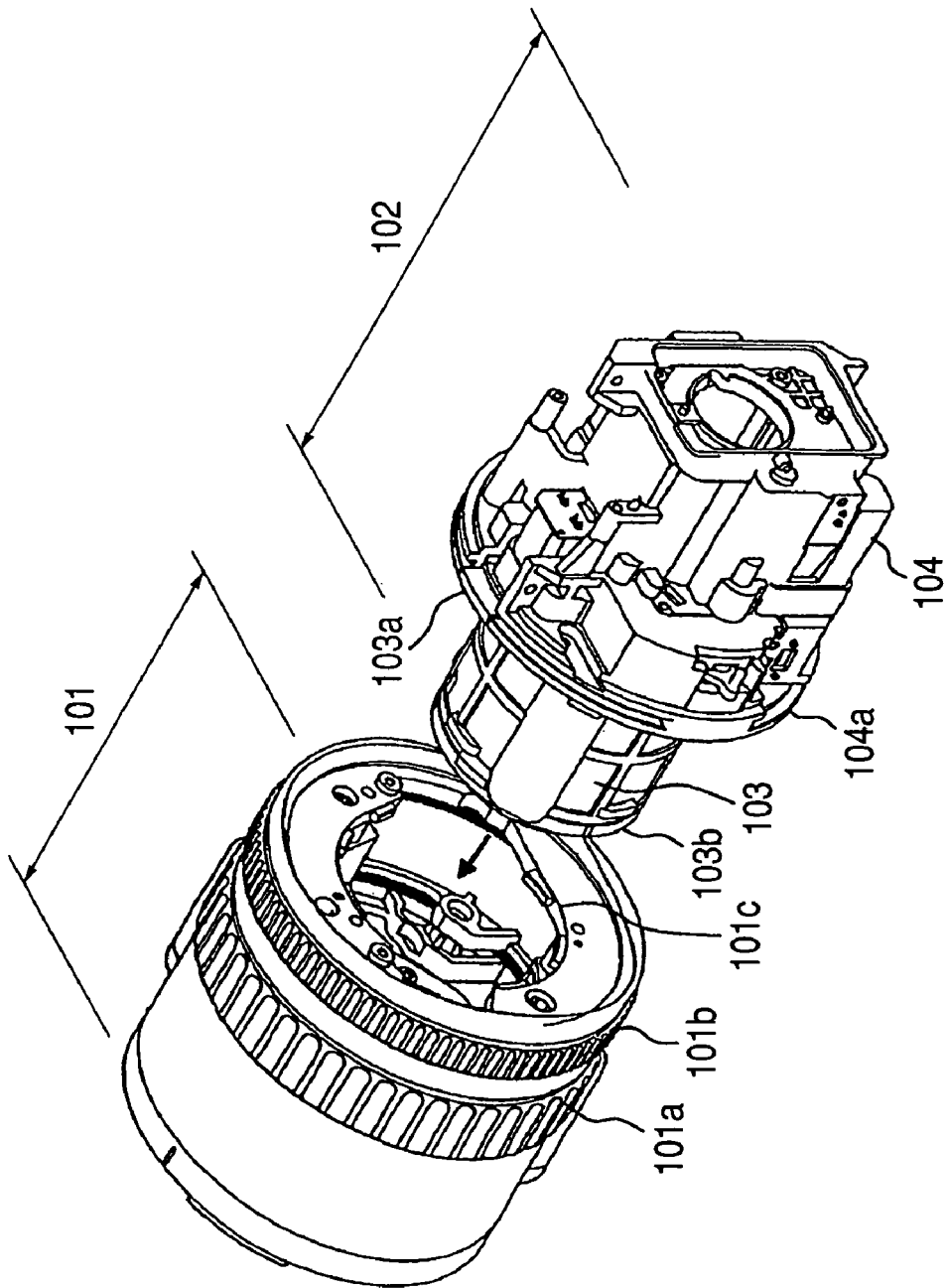
FIG. 7 is a disassembled perspective view showing a structure of a conventional image taking optical unit.

Note that, as shown in FIG. 6, an inner periphery 6*c* of the cylindrical section 6*b* of the intermediate lens barrel 6 is formed in a shape close to rectangular rather than circular. However, here, a circle 6*d* inscribing the inner periphery 6*c* is taken into consideration, and a diameter of the circle 6*d* is assumed to be an inner diameter (minimum inner diameter) of the cylindrical section 6*b*.

Figure 4:
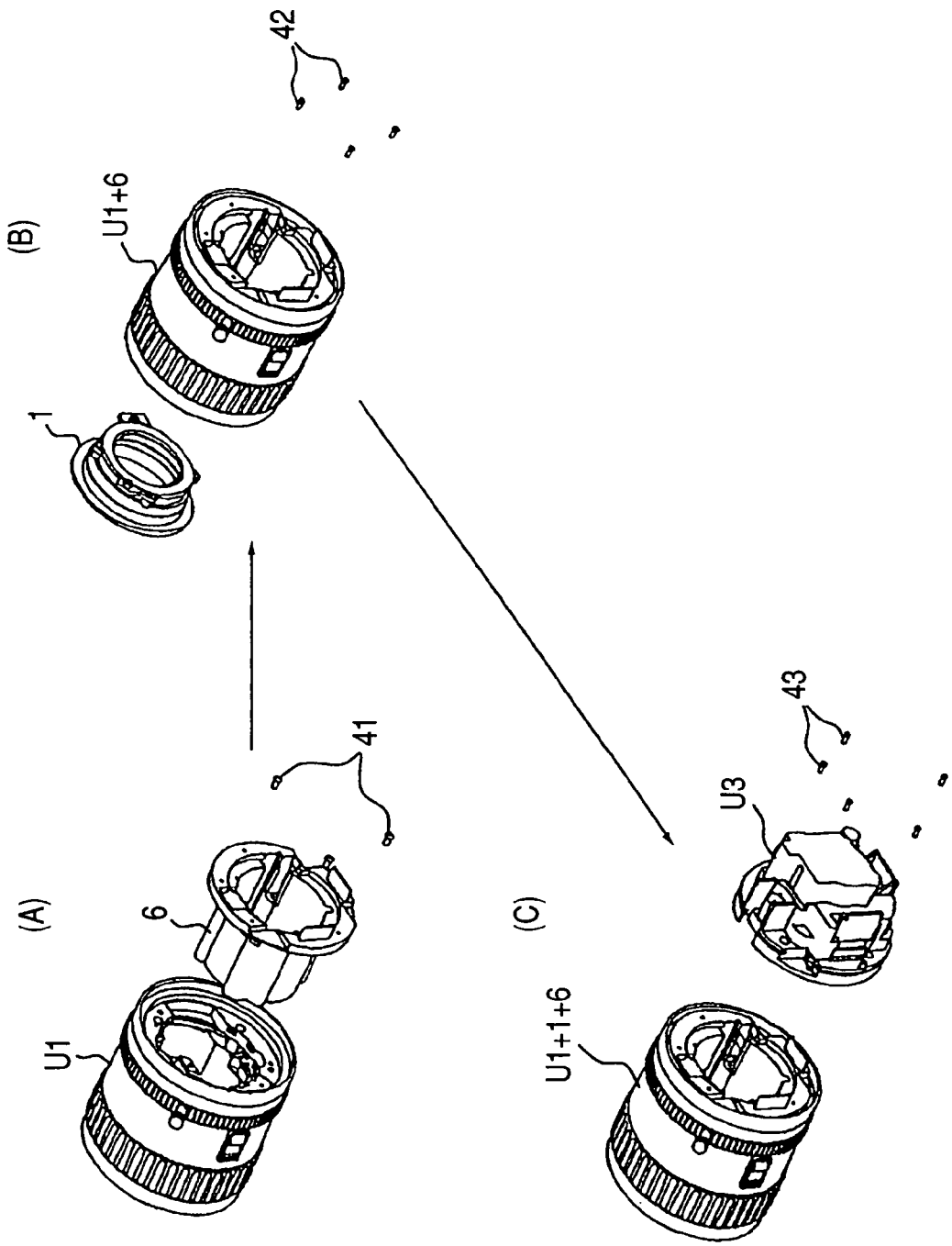
FIG. 4 is a perspective view showing assembling procedures for the image taking optical unit.

Next, assembling procedures of the image taking optical unit in this embodiment will be explained with reference to (A) to (C) of FIG. 4.

(A) First, the cylindrical section 6*b* of the intermediate lens barrel 6 is inserted into the inside of the external unit U1 from the image pickup element 31 side (image surface side) to fix the flange section 6*a* of the intermediate lens barrel 6 to the external unit U1 with screws 41.

(B) Next, the cylindrical section 1*b* of the front lens barrel 1 is inserted into the inside of the external unit U1 from a subject side (object side) to fix (combine) the cylindrical section 1*b* of the front lens barrel 1 to the intermediate lens barrel 6 with screws 42 after being positioned with respect to the intermediate lens barrel 6.

Note that, as shown in FIG. 6, the front lens barrel 1 and the intermediate lens barrel 6 are fixed in four portions further on the inner side than the inner diameter 6*c* of the intermediate lens barrel 6 from the image pickup element 31 side with the screws 42. This makes it possible to easily perform work for combining the intermediate lens barrel 6 and the front lens barrel 1 inserted into the inside of the external unit U1. In addition, since the front lens barrel 1 and the intermediate lens barrel 6 can be tightened and fixed from the image pickup element 31 side with the screws 42, the screws 42 are never exposed to the outside. Further, the screws 42 combining the front lens barrel 1 and the intermediate lens barrel 6 are arranged further on the inner side than the inner periphery 6*c* of the intermediate lens barrel 6, whereby a projection shape as an unnecessary screwing section can be prevented from being formed in the front lens barrel 1 and the intermediate lens barrel 6.

(C) A rear unit U3, in which the zoom lens unit L2, the correction lens holding frame 3 (correction lens unit L3), the focus lens unit L4, the lens stop unit 7, the image pickup element 31, and the like are assembled to the rear lens barrel 5, is positioned with respect to the unit, which is assembled by the procedure (B), from the image pickup element 31 side and fixed with screws 43. Consequently, the assembling of the image taking optical unit is completed.

Figure 5A:
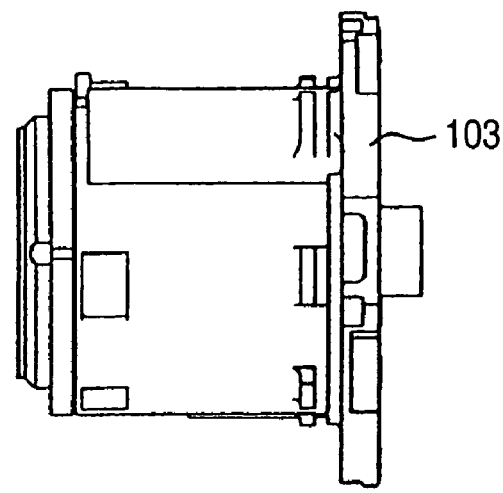
FIG. 5A is a side view showing a conventional front holding barrel.

Conventionally, as shown in FIG. 5A, the front holding barrel 103 holding the front lens unit is given a shape for taking a role of combining with the rear lens barrel. Consequently, since the inner diameter of the external unit U1 is required to clear the outer diameter of the front holding barrel 103, not only the outer diameter of the front holding barrel 103 but also the inner diameter and outer diameter of the external unit U1 increase in accordance with an increase in the front lens diameter.

Figure 5B:
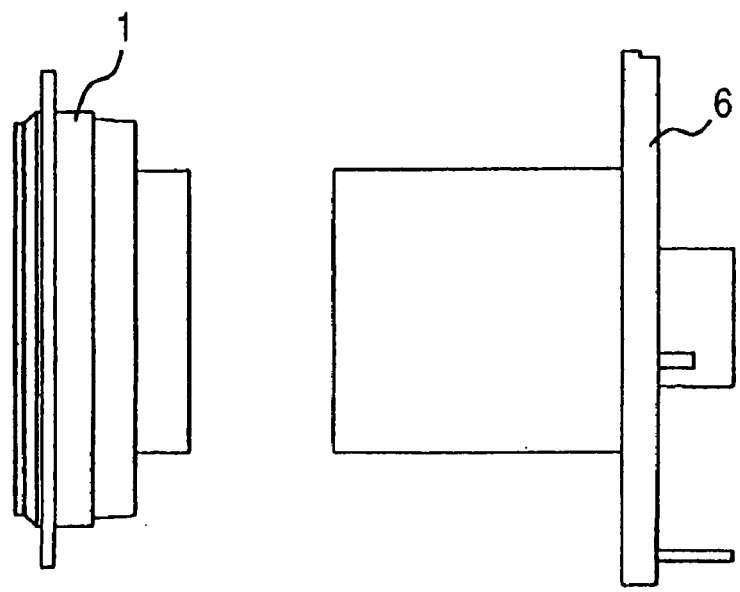
FIG. 5B is a side view showing the front lens barrel and the intermediate lens barrel of the embodiment.

In contrast, according to this embodiment, as shown in FIG. 5B, a member equivalent to the front holding barrel 103 is divided into two sections, the front lens barrel 1 and the intermediate lens barrel 6, to sandwich the external unit U1 from the front and the rear in the optical axis direction. This makes it possible to assemble the external unit U1 around the outer periphery of the lens barrel unit U2 without being affected by the front lens diameter. Even if the front lens diameter increases, it is almost unnecessary to increase the inner diameter and outer diameter of the external unit U1. Therefore, the external unit U1 and the entire image taking optical unit including the external unit U1 can be reduced in size.

In other words, since the external unit U1 can be arranged in a space, which has been a dead space in an assembly structure conventionally, the outer diameter of the external unit U1 can be reduced.

Further, since the front lens barrel 1 and the intermediate lens barrel 6 can be assembled from the front and the rear of the external unit U1, assemblability of the image taking optical unit is not significantly damaged compared with that in the past.

Moreover, in this embodiment, since the section having the minimum inner diameter of the external unit U1 is set smaller than the maximum outer diameter of the front lens unit L1, the outer diameter of the external unit U1 can be further reduced.

Since the screwing position (combining portion) of the front lens barrel 1 and the intermediate lens barrel 6 is provided further on the inner side than the inner periphery of the intermediate lens barrel 6, a shape for the screwing can be prevented from being exposed to the outer diameter side of the front lens barrel 1.

Since the front lens barrel 1 and the intermediate lens barrel 6 are divided, the flare cut stop 1*c* described above can be formed on the inner periphery of the front lens barrel 1 easily in forming the front lens barrel 1 with resin.

Note that, in the embodiment, the image pickup apparatus of a lens (image taking unit) integrated type has been explained. However, the present invention can also be applied to a lens apparatus (optical apparatus) of a replacement type that is detachably attachable to a camera body.

In addition, in the embodiment, the optical apparatus including the image taking optical system with the four-lens unit structure has been explained. However, the present invention can also be applied to optical apparatuses including image taking optical systems of other structures.

Further, an optical encoder (electric component) consisting of an optical scale and a photo-sensor may be used instead of the MR encoder in the embodiment to detect rotation of the manual rings 20 and 21.

According to the embodiment, the minimum inner diameter of the control unit is set smaller than the maximum diameter of the first lens unit as described above. Thus, even if the outer diameter of the first lens unit increases, an increase in the outer diameter of the control unit can be suppressed without an unreasonable reduction in difference of inner and outer diameters (thickness in the diameter direction) of the control unit. Therefore, the entire optical apparatus can be constituted small in size despite the size of the outer diameter dimension of the first lens unit.

When the optical apparatus with such a structure is assembled, it is advisable to, for example, insert the small diameter sections having outer diameters smaller than the inner diameter of the control unit, which are provided in the first lens barrel and the second lens barrel, into the inside of the control unit from opposite directions in the optical axis direction to combine both the small diameter sections. This makes it possible to assemble the first lens barrel and the second lens barrel easily to the control unit that is constituted as a unit as in the past.

Further, the control unit is arranged so as to be sandwiched between the large diameter sections having larger diameters than the inner diameter of the control unit in the first lens barrel and the second lens barrel, whereby a space for arranging the control unit can be secured sufficiently while the large diameter sections are avoided. In addition, in the case where the third lens barrel (the lens barrel, which holds at least one of the lens unit, the lens stop, and the image pickup element, arranged further on the image surface side than the second lens unit) is combined with the large diameter section of the second lens barrel, a space for performing the combination can be secured sufficiently.

Moreover, the section combining the second lens barrel and the first lens barrel is provided further on the inner side than the inner periphery of the second lens barrel, whereby the combining section can be prevented from being exposed to the outside of the first or second lens barrel, and combination work can be performed easily.

This application claims priority from Japanese Patent Application No. 2003-354153 filed on Oct. 14, 2003, which is hereby incorporated by reference herein.

What is claimed is:

1. An optical apparatus, comprising:
an image taking optical system that includes a first lens unit arranged in the nearest side to an object and a second lens unit movable in an optical axis direction in an image surface side area in regard to the first lens unit;
a first lens barrel unit that holds the first lens unit;
a second lens barrel unit that is combined with the first lens barrel unit and that houses the second lens unit so that the second lens unit is movable;
a control unit that is arranged around an outer periphery of the second lens barrel unit and includes an operation element, which is operated in order to instruct driving of the second lens unit, and an electric component for controlling the driving of the second lens unit according to the operation of the operation element; and
a third lens barrel unit which holds at least one of a lens unit, a lens stop, and an image pickup element arranged further on an image surface side than the second lens unit,
wherein a maximum outer diameter of the first lens unit is larger than a minimum inner diameter of the control unit, and
wherein the control unit is arranged between large diameter sections which have outer diameters larger than an inner diameter of the control unit, respectively, in the first lens barrel unit and the second lens barrel unit, and wherein the third lens barrel unit is combined with the large diameter section in the second lens barrel unit.

2. An optical apparatus according to claim 1, wherein a section for connecting the second lens barrel unit and the first lens barrel unit is provided further on an inner side than an inner periphery of the second lens barrel unit.

* * * * *